Nov. 11, 1958     C. E. HOOPER ET AL     2,859,844
FLUID AND MECHANICAL COUPLING WITH CENTRIFUGAL
AND FRICTIONAL CLUTCHES
Filed May 14, 1953
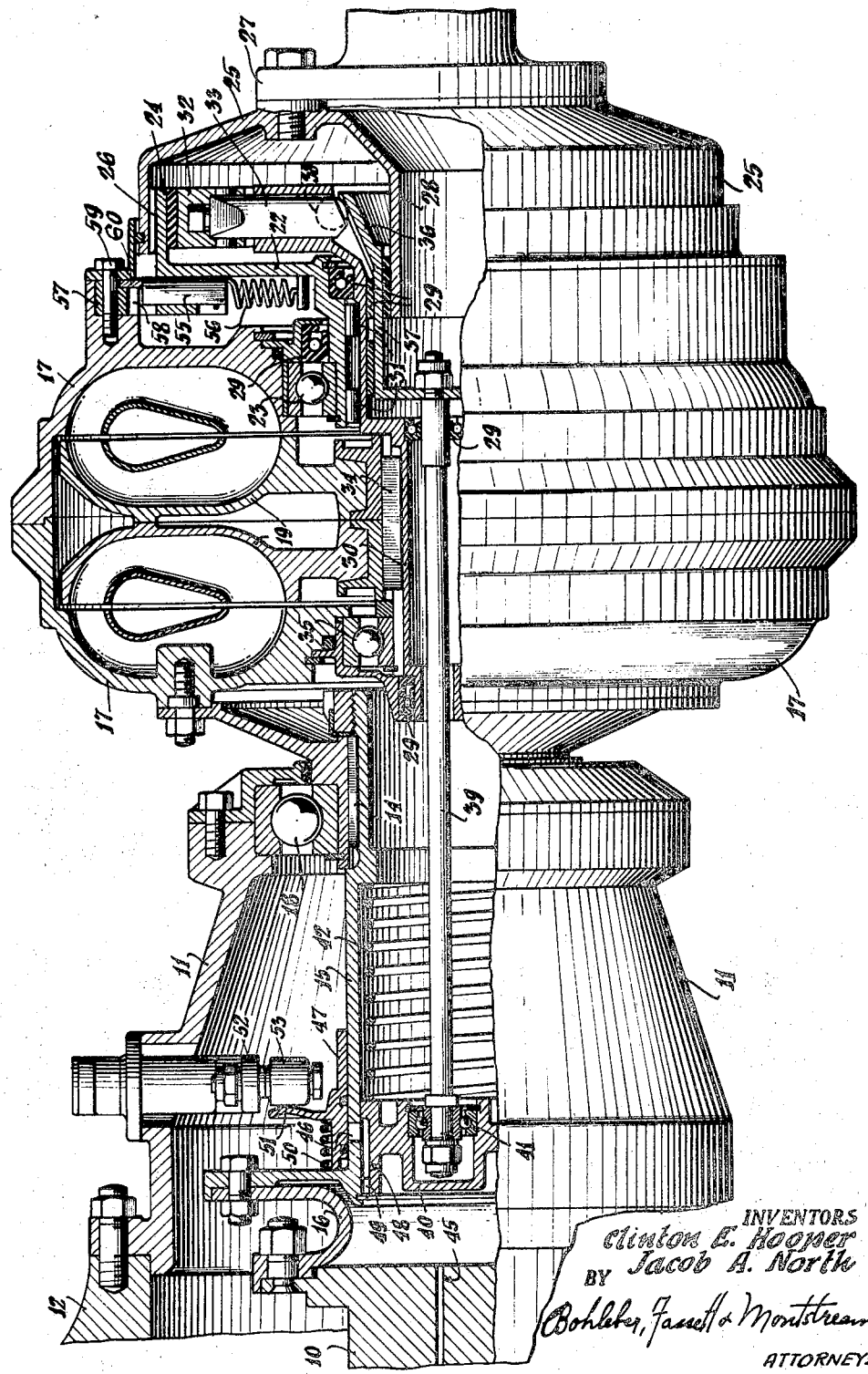
INVENTORS
Clinton E. Hooper
BY Jacob A. North
Bohler, Fassett & Montstream
ATTORNEYS

United States Patent Office 2,859,844
Patented Nov. 11, 1958

2,859,844

FLUID AND MECHANICAL COUPLING WITH CENTRIFUGAL AND FRICTIONAL CLUTCHES

Clinton E. Hooper, New Fairfield, and Jacob A. North, Norwalk, Conn., assignors to Doman Helicopters, Inc., Danbury, Conn., a corporation of Delaware Application May 14, 1953, Serial No. 355,088

13 Claims. (Cl. 192—3.2)

The invention relates to a fluid and mechanical coupling having general applicability but finding its particular usefulness in connecting an engine or motor with the rotor of a self sustaining aircraft such as a helicopter and the like. Since the rotor is heavy, it has considerable inertia and a fluid coupling is desirable to bring the same from non-rotating to an idling or intermediate speed of about 100 R. P. M. through the fluid coupling. When the rotor has been brought to idling speed, a centrifugal clutch is utilized to establish direct driving connection between the engine shaft and the rotor which is accomplished by mechanically clutching or locking the driven mechanism to the driving element or impeller of the fluid coupling. It is also desirable that the engine be permitted to idle without driving the rotor and a friction clutch is utilized also to disconnect the driven element of the fluid coupling with the driven mechanism or rotor.

It is an object of the invention to construct an improved form of fluid coupling utilizing a friction clutch between the fluid driven element of the fluid coupling and the driven mechanism and having a centrifugally operated clutch providing a direct mechanical driving connection between the driving element or impeller of the fluid coupling and the driven mechanism.

Another object is to construct a fluid and mechanical coupling as above utilizing fluid pressure means to control the friction clutch.

A still further object is to construct a fluid and mechanical coupling which is compactly arranged and in which the parts are easily disassembled for inspection, maintenance and repair.

Another object is to provide a thrust eliminator as a part of the driven mechanism to permit relative axial freedom of movement of the driven shaft and which serves also as a housing for the friction clutch.

Other objects of the invention will be apparent from the following description when taken in connection with the accompanying drawing illustrating a preferred embodiment of the invention in which:

The figure is a partial longitudinal section through the fluid and mechanical coupling.

The fluid coupling will be secured in any suitable fashion to the motor in alignment with the output shaft. For self sustaining aircraft this will mean in alignment with the crank shaft 10 of the engine. An extension housing 11 is secured to the crank case 12 of the engine.

The fluid and mechanical coupling has a shaft 15 which is connected with the crank shaft in any suitable fashion that shown being a flexible connector 16. The shaft is preferably tubular for reasons which will appear hereinafter. The tubular shaft is keyed 14 to the driving element or impeller 17 of the fluid coupling which is rotatably mounted upon a bearing 18 carried by the extension housing 11. The fluid coupling has a fluid driven element or impeller 19. The fluid coupling may be of any suitable kind that particularly shown being of the double impeller or runner type. The driving connection between the driving element 17 and the fluid driven element 19 is the fluid within the coupling. The fluid coupling preferably is a relatively small coupling, that is, one which has only a fraction of the power capabilities required to drive the rotor in flight but of sufficient capacity to start the rotation of the rotor and bring it up to an intermediate or idling speed of say 100 R. P. M.

The driven mechanism are those parts driven by the fluid and mechanical coupling and include a radial flange 22 which is mounted for rotation relatively to the driving element 17 on a bearing 23. The radial flange carries a laterally extending drum 24 which forms part of a friction clutch as will be described more fully hereinafter. The driven mechanism also includes a thrust eliminator or means 25 which carries keys or splines 26 for rotatively connecting the flange 22 with the thrust eliminator. The keying or splining permits axial movement of the thrust eliminator but transmits power or torque therethrough. The thrust eliminator preferably carries a tubular skirt 28 which is slidably supported by the sleeve 37 and retains the thrust eliminator 25 and shaft 27 in alignment so that this function need not be served by the splines although both parts may serve to maintain alignment. The thrust eliminator also surrounds the friction clutch so that it also serves as a housing therefor. The splines also permit easy removal of the housing from the flange or particularly the drum 24 thereof for easy inspection, maintenance and repair. The thrust eliminator 25 is adapted to be connected with the mechanism such as a rotor to be driven through the fluid and mechanical coupling, the connection shown being a connector or driven shaft 27 to the rotor of a self sustaining aircraft.

The driven mechanism including the flange 22 and the thrust eliminator 25 is connectable with the fluid driven element or runner 19 of the fluid coupling through a friction clutch. The friction clutch may be of any suitable type or construction that particularly shown being a drum type. A sleeve 30 carries a key 34 connecting the sleeve to the driven element 19 of the fluid coupling. The sleeve is supported on bearings 31 between it and the flange 22 and on bearing 35. The sleeve carries friction shoes 32 which are forcibly brought into contact with the inner surface of the drum 24 by any suitable mechanism that shown including a shoe plunger 33 carried by the sleeve and mounted for radial movement. Pressing of the shoe plunger outwardly brings the friction shoes 32 into frictional engagement with the inner surface of the drum 24 to establish a driving connection between the sleeve and fluid driven element 19 and the driven mechanism. Suitable fluid seals 29 are used.

Pilot operated means controls the engagement or operation of the friction clutch and in the broader aspect of the invention may be of any suitable construction. Preferably the operating means includes a cone 36 carried by an axially slidable sleeve 37 whereby movement of the cone to the left as shown in the drawing pushes the shoe plunger 33 radially outward. Movement of the cone to the right permits the shoe plunger to move radially inwardly and release the friction clutch. A roller 38 carried by the end of the shoe plunger directly contacts with the cone 36. The sleeve 37 and cone 36 are moved axially through a connecting rod 39 which is preferably operated by hydraulic means. The hydraulic means particularly shown includes a piston 40 connected with the rod 39 through a bearing 41 which permits relative rotation between the piston rod and the piston. A spring 42 propels the piston and the friction clutch operating means including the connecting rod 39 and cone 36 to the left. The piston is slidable in the tubular shaft 15 so that it serves both as a driving shaft as well as a cylinder.

Fluid pressure is applied to the left hand side of the piston 40 from any suitable source that illustrated including an oil bore or channel 45 in the engine crank shaft and is connected with the pressure lubricating supply of the engine. The tubular shaft or cylinder 15 has a port 46 through the wall thereof and a valve 47 is slidably mounted on the tubular shaft to control the oil flow through the port and hence the oil pressure on the left hand side of the piston. In order to permit a shorter cylinder or tubular shaft, the port 46 is located between the ends of the piston and in order to provide a fluid passage from the left hand side of the piston through the port a circumferential groove 48 is provided in the piston which is connected by lateral passages 49 with the left hand end of the cylinder or piston. A spring 50 presses the valve to the right and a flange 51 carried by the valve is engaged by a valve lever 52 or a roller 53 carried thereby which is pivotally mounted upon and projects through the wall of the extension housing 11. It has a suitable handle or means (not shown) for turning the lever by the pilot and operating the valve.

With the valve 47 closing the port 46 as shown in the drawing, full fluid pressure is applied to the left hand side of the piston 40 and it is forced to the right, against the tension of the spring 42 which propels the connecting rod 39, sleeve 37 and cone 36 to the right so that the friction clutch is disengaged. When the friction clutch is disengaged there is no driving connection between the fluid driven element 19 of the fluid coupling and the driven mechanism including the drum 24 and thrust eliminator 25. When the pilot wishes to engage the friction clutch, the operating lever 52 is moved or pivoted to the right so that the spring 50 propels the valve 47 to the right and opens the port 46. The fluid in the cylinder on the pressure side of the piston bleeds or passes through the grooves 49 and 48 and the valve port 46 into the low or zero pressure of the interior of the extension housing and returns to the crank case of the engine for recirculation. This bleed or escape of fluid reduces the fluid pressure on the left hand side of the piston so that the spring 42 forces the piston to the left which moves the cone 36 to the left and engages the friction clutch. With the friction clutch engaged, a driving connection is established between the fluid driven element 19 and the driven mechanism 24, 25 through the sleeve 30 and friction clutch.

A centrifugal clutch provides a mechanical connection between the flange 22 which is a part of the driven mechanism and the driving element or impeller 17 of the fluid coupling. This centrifugal clutch may take any suitable form that illustrated including a locking means or pawl means which is carried by the flange 22 and radially movable thereon. The locking means particularly shown is one or more radially slidable plungers 55 carried by the flange 22. A spring 56 normally holds or propels the locking means radially inward. When the driven mechanism, or the rotor, is turning at its normal or idling speed, the locking means moves radially outward to engage a notched synchronizing ring 57 and perhaps a notch 58 therein. The ring is carried by the driving element of the fluid coupling to which it is secured by bolts 59.

Usually interengagement of the locking means or pawl means with a notch 58 is prevented by a synchronizer or blocker ring 60 until the clutch parts are rotating at the same speed which with the fluid drive is the subject of an application filed by Glidden S. Doman Serial No. 347,543, filed April 8, 1953. When the speed of the driven mechanisms 22, 25, 27 is the same as the engine speed or that of the clutch drum 24, as shown by tachometers, the engine throttle is chopped which slows down the engine relatively to the driving mechanism so that relative rotation is secured between the locking or pawl means and the blocker ring 60 and the locking means is projected into a notch. With the centrifugal clutch engaged, the driving mechanisms 22, 25, 27 is directly and mechanically connected with the driving element 17 of the fluid coupling, the tubular shaft 15, and the crank shaft 10 of the engine after which the engine is again speeded up. Locking up of the centrifugal clutch is indicated by the tachometers indicating the same speed.

The fluid and mechanical coupling described operates in the following manner. With the valve 47 in the position shown in the drawings with the port 46 closed and the engine running, fluid pressure is applied on the left hand side of the piston 40, which holds the friction clutch disengaged. The engine is turning the tubular shaft or cylinder 15 and the driving element 17 of the fluid coupling. There is no driving connection between the engine and the driving means 22, 25, 27 and the rotor. When the pilot wishes to start rotating the rotor, the valve operating lever 52 is moved or turned to the right and the spring 50 pushes the valve 47 to uncover the port 46. With fluid pressure reduced or removed on the left hand side of the piston, the spring 42 pushes the piston to the left and moves with it the connecting rod 39, sleeve 37 and cone 36. This presses the friction clutch plunger 33 outwardly and the friction shoe or shoes 32 frictionally engage or contact the friction clutch drum 24 to establish a driving connection between the driven element 19 of the fluid coupling and the driven mechanism. There is no slippage in the frictional clutch or only enough initially to stop or slow down the driven element 19 because the fluid coupling provides the necessary slip between the driving element 17 which is rotating at engine speed. The fluid coupling begins to turn the fluid driven element 19 which starts rotation of the driven mechanism and the rotor. When the rotor reaches the appropriate lock-up or intermediate speed the centrifugal clutch is ready to engage since centrifugal force on the locking or pawl means 55 has overcome the inward pull of the spring 56 and it is ready to engage in a notch 57. The pilot secures engagement of the centrifugal clutch as described above and in the application referred to. The driving mechanism and rotor are thereby brought into direct mechanical driving connection with the engine through the tubular shaft 15, the driving element 17, the centrifugal clutch and the driving mechanism formed by the flange 22, drum 24 and thrust eliminator 25.

When the pilot wishes to stop rotation of the rotor when it is on the ground, the engine is slowed down to a speed where the spring tension 56 overcomes the centrifugal force on the centrifugal pawl or locking means 55 so that the spring 56 disengages it from the notch 58 in the drive ring 57. The pilot either before or after the engine is slowed down moves the valve 47 to close the port 46 which releases the friction clutch. Since the engine is now disconnected from the driving mechanism and rotor, it may continue to turn while the rotor can be brought to a stop.

The lock-up type centrifugal clutch described reduces all slippage and load from the friction clutch so that wear and heat therefrom is eliminated while flying. When both clutches are disengaged, the engine is rotating the driving element 17 of the fluid coupling which rotates the driven element 19, the fluid in the fluid coupling and the sleeve 30 with its attached friction clutch parts all of which serve therefore as engine flywheel and promote smooth idling of the engine. With both clutches disengaged, the load is off of the fluid coupling and it can run for long periods without overheating.

This invention provides an improvement in a fluid and mechanical coupling with centrifugal and frictional clutches. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A fluid and mechanical coupling comprising a fluid coupling having a driving element and a fluid driven element; a driven mechanism including a flange rotatably mounted relatively to the driving element, and a clutch drum extending laterally therefrom; a friction clutch connecting the fluid driven element with the clutch drum of the driven mechanism, means to operate the friction clutch, and a centrifugally operated clutch for connecting the driven mechanism and the driving element including locking means mounted for radial movement upon the flange under the influence of centrifugal force, spring means propelling the locking means inwardly, and a notched means carried by the driving element for engagement by the locking means; and the driven mechanism including means connected with the clutch drum for axial movement relatively thereto for thrust elimination.

2. A fluid and mechanical coupling comprising a fluid coupling having a driving element and a fluid driven element; a driven mechanism including a flange rotatably mounted relatively to the driving element, and a clutch drum extending laterally therefrom; a friction clutch for connecting the fluid driven element with the clutch drum of the driven mechanism, means to operate the friction clutch; and a centrifugally operated clutch for connecting the driven mechanism and the driving element including locking means mounted for radial movement upon the flange under the influence of centrifugal force, spring means propelling the locking means inwardly, and a notched means carried by the driving element for engagement by the locking means; and the driven mechanism including a housing connected with the flange and enclosing the friction clutch means and movable axially on the flange.

3. A fluid and mechanical coupling comprising a fluid coupling having a driving element and a fluid driven element; a driven mechanism including a flange rotatably mounted upon the driving element, and a clutch drum extending laterally therefrom; a friction clutch connecting the fluid driven element with the clutch drum of the driven mechanism, means to operate the friction clutch, and a centrifugally operated clutch for connecting the driven mechanism and the driving element including locking means mounted for radial movement upon the flange under the influence of centrifugal force, spring means propelling the locking means inwardly, and a notched means carried by the driving element for engagement by the locking means; and the driven mechanism including means connected with the flange for axial movement relatively thereto for thrust elimination and enclosing the friction clutch means and movable axially on the flange.

4. A fluid and mechanical coupling comprising a fluid coupling having a driving element and a fluid driven element, a driven mechanism, a friction clutch for connecting the fluid driven element with the driven mechanism; means to operate the friction clutch including a cylinder having a power coupling at one end for connection with a power source for the fluid coupling and fixedly connected at the other end with the driving element and transmitting rotational power to the latter through the cylinder, a piston slidable in the cylinder, means connecting the piston and the friction clutch, spring means engaging the piston and propelling the same to clutch engaging position, and valve means controlling fluid pressure on the piston.

5. A fluid and mechanical coupling as in claim 4 including a housing around the cylinder, a port through the cylinder, a valve slidable on the cylinder and retained in position closing the port, and means carried by the housing to move the valve means to open the port.

6. A fluid and mechanical coupling comprising a fluid coupling having a driving element and a fluid driven element, a driven mechanism, a friction clutch for connecting the fluid driven element with the driven mechanism means to operate the friction clutch including a tubular drive shaft fixedly connected at one end with the driving element and forming a cylinder, a power coupling secured to the other end of the drive shaft to which rotational power is applied to drive the driving element, a piston slidable in the cylinder, means connecting the piston and the friction clutch, spring means engaging the piston and propelling the same to clutch engaging position, a port through the cylinder, valve means slidable on the cylinder and normally closing the port, and means to move the valve means to control the fluid pressure on the piston; and a centrifugally operated clutch connecting the driven mechanism and the driving element.

7. A fluid and mechanical coupling comprising a fluid coupling having a driving element and a fluid driven element, a driven mechanism including a flange rotatably mounted upon the driving element, a friction clutch connecting the fluid driven element with the driven mechanism, means to operate the friction clutch including a cylinder connected with the driving element and transmitting rotation therethrough, a piston in the cylinder, means connecting the piston and the friction clutch, spring means engaging the piston and propelling the same to clutch engaging position, and valve means controlling fluid pressure on the piston; and a centrifugally operated clutch connecting the driven mechanism and the driving element including locking means mounted for radial movement upon the flange under the influence of centrifugal force, spring means connected with and propelling the locking means inwardly, and a notched means carried by the driving element for engagement by the locking means.

8. A fluid and mechanical coupling comprising a fluid coupling having a driving element and a fluid driven element, a driven mechanism including a flange rotatably mounted upon the driving element, a friction clutch connecting the fluid driven element with the driven mechanism; means to operate the friction clutch including a cylinder connected with the driving element, a piston slidable in the cylinder, means connecting the piston and the friction clutch, spring means engaging the piston and propelling the same to clutch engaging position, a port into the cylinder and valve means normally closing the port to control fluid pressure on the piston; and a centrifugally operated clutch connecting the driven mechanism and the driving element including locking means mounted for radial movement upon the flange under the influence of centrifugal force, spring means connected with and propelling the locking means inwardly, and a notched means carried by the driving element for engagement by the locking means.

9. A fluid and mechanical coupling comprising a fluid coupling having a driving element and a fluid driven element, a driven mechanism including a flange rotatably mounted upon the driving element, a friction clutch connecting the fluid driven element with the driven mechanism; means to operate the friction clutch including a cylinder connected with the driving element, a piston slidable in the cylinder, means connecting the piston and the friction clutch, spring means engaging the piston and propelling the same to clutch engaging position, a port through the cylinder, valve means slidable on the cylinder and normally closing the port, and means to move the valve means to control the fluid pressure on the piston; and a centrifugally operated clutch connecting the driven mechanism and the driving element including locking means mounted for radial movement upon the flange under the influence of centrifugal force, spring means connected with and propelling the locking means inwardly, and a notched means carried by the driving element for engagement by the locking means.

10. A fluid and mechanical coupling comprising a fluid coupling having a driving element and a fluid driven element, a driven mechanism including a flange rotatably mounted upon the driving element, a friction clutch connecting the fluid driven element with the driven mechanism; means to operate the friction clutch including a tubular drive shaft axially connected with the driving element and forming a cylinder, a piston slidable in the cylinder, means connecting the piston and the friction clutch, spring means engaging the piston and propelling the same to clutch engaging position, a port through the cylinder, valve means slidable on the cylinder and normally closing the port, and means to move the valve means to control the fluid pressure on the piston; and a centrifugally operated clutch connecting the driven mechanism and the driving element including locking means mounted for radial movement upon the flange under the influence of centrifugal force, spring means connected with and propelling the locking means inwardly, and a notched means carried by the driving element for engagement by the locking means.

11. A fluid and mechanical coupling comprising a fluid coupling having a driving element and a fluid driven element; a driven mechanism including a flange rotatably mounted upon the driving element, and means rotatively connected with the flange and mounted thereon for axial movement for thrust elimination, a friction clutch connecting the fluid driven element with the driven mechanism; means to operate the friction clutch including a tubular drive shaft axially connected with the driving element and forming a cylinder, a piston slidable in the cylinder, means connecting the piston and the friction clutch, spring means engaging the piston and propelling the same to clutch engaging position, a port through the cylinder, valve means slidable on the cylinder and normally closing the port, and means to move the valve means to control the fluid pressure on the piston; and a centrifugally operated clutch connecting the driven mechanism and the driving element including locking means mounted for radial movement upon the flange under the influence of centrifugal force, spring means connected with and propelling the locking means inwardly, and a notched means carried by the driving element for engagement by the locking means.

12. A fluid and mechanical coupling comprising a fluid coupling having a driving element and a fluid driven element, a driven mechanism including a flange rotatably mounted upon the driving element, a clutch drum extending laterally therefrom, and means rotatively connected with the friction drum and mounted thereon for axial movement for thrust elimination, a friction clutch connecting the fluid driven element with the driven mechanism; means to operate the friction clutch including a tubular drive shaft axially connected with the driving element and forming a cylinder, a piston slidable in the cylinder, means connecting the piston and the friction clutch, spring means engaging the piston and propelling the same to clutch engaging position, a port through the cylinder, valve means slidable on the cylinder and normally closing the port, and means to move the valve means to control the fluid pressure on the piston; and a centrifugally operated clutch connecting the driven mechanism and the driving element including locking means mounted for radial movement upon the flange under the influence of centrifugal force, spring means connected with and propelling the locking means inwardly, and a notched means carried by the driving element for engagement by the locking means.

13. A fluid and mechanical coupling comprising a fluid coupling having a driving element and a fluid driven element, a driven mechanism including a flange rotatably mounted upon the driving element, a clutch drum extending laterally therefrom, means rotatively connected with the drum and mounted thereon for axial movement for thrust elimination, and a skirt carried by the thrust eliminator enclosing the friction clutch; a friction clutch connecting the fluid driven element with the driven mechanism; means to operate the friction clutch including a tubular drive shaft axially connected with the driving element and forming a cylinder, a piston slidable in the cylinder, means connecting the piston and the friction clutch, spring means engaging the piston and propelling the same to clutch engaging position, a port through the cylinder, valve means slidable on the cylinder and normally closing the port, and means to move the valve means to control the fluid pressure on the piston; and a centrifugally operated clutch connecting the driven mechanism and the driving element including locking means mounted for radial movement upon the flange under the influence of centrifugal force, spring means connected with and propelling the locking means inwardly, and a notched means carried by the driving element for engagement by the locking means.

References Cited in the file of this patent

UNITED STATES PATENTS

| | | |
|---|---|---|
| 2,077,292 | Waseige | Apr. 13, 1937 |
| 2,170,649 | Banker | Aug. 22, 1939 |
| 2,256,960 | Neracher et al. | Sept. 23, 1941 |
| 2,360,710 | Nutt et al. | Oct. 17, 1944 |
| 2,414,359 | Carnagua et al. | Jan. 14, 1947 |
| 2,625,247 | Shurts | Jan. 13, 1953 |
| 2,644,535 | Koup et al. | July 7, 1953 |
| 2,716,906 | Seybold | Sept. 6, 1955 |

FOREIGN PATENTS

| | | |
|---|---|---|
| 825,319 | France | Mar. 1, 1938 |